(12) United States Patent
Cantu

(10) Patent No.: US 7,307,249 B2
(45) Date of Patent: Dec. 11, 2007

(54) SYSTEM AND METHODS FOR PREPARING SUBSTITUTE FOOD ITEMS

(76) Inventor: Homaro R. Cantu, 3829 N. Tripp, Chicago, IL (US) 60641

( * ) Notice: Subject to any disclaimer, the term of this patent is extended or adjusted under 35 U.S.C. 154(b) by 0 days.

(21) Appl. No.: 11/238,410

(22) Filed: Sep. 29, 2005

(65) Prior Publication Data

US 2006/0081619 A1   Apr. 20, 2006

Related U.S. Application Data

(60) Provisional application No. 60/614,777, filed on Sep. 30, 2004.

(51) Int. Cl.
*H05B 6/80* (2006.01)
(52) U.S. Cl. ..................................... 219/725
(58) Field of Classification Search ................ 219/725, 219/726, 727, 728, 729, 730, 731, 732, 733, 219/734, 735; *H05B 6/80*
See application file for complete search history.

(56) References Cited

U.S. PATENT DOCUMENTS

| | | | |
|---|---|---|---|
| 4,168,662 A | 9/1979 | Fell | |
| 4,531,292 A | 7/1985 | Pasternak | |
| 4,668,521 A | 5/1987 | Newsteder | |
| 4,670,271 A | 6/1987 | Pasternak | |
| 5,017,394 A | 5/1991 | Macpherson et al. | |
| 5,035,907 A | 7/1991 | Phillips et al. | |
| 6,152,024 A * | 11/2000 | Tippmann ..................... | 99/472 |
| 6,231,957 B1 | 5/2001 | Zerbe et al. | |
| 6,299,374 B1 | 10/2001 | Naor et al. | |
| 6,319,530 B1 | 11/2001 | Stewart | |
| 6,355,285 B1 | 3/2002 | Hoy | |
| 6,376,000 B1 | 4/2002 | Waters | |
| 6,432,462 B2 | 8/2002 | Brissonneau | |
| 6,488,794 B1 * | 12/2002 | Bright et al. ................. | 156/86 |
| 6,499,842 B1 | 12/2002 | Kofman et al. | |
| 6,511,687 B2 | 1/2003 | Hoy | |
| 6,536,345 B1 | 3/2003 | Young | |
| 6,582,742 B2 | 6/2003 | Stewart | |
| 6,596,298 B2 | 7/2003 | Leung et al. | |
| 6,616,958 B1 | 9/2003 | Stewart | |
| 6,623,553 B2 | 9/2003 | Russell et al. | |
| 6,652,897 B1 | 11/2003 | Stewart | |
| 6,656,493 B2 | 12/2003 | Dzija et al. | |
| 6,740,332 B2 | 5/2004 | Zyck et al. | |
| D493,601 S | 8/2004 | Kofman | |
| 6,838,101 B2 | 1/2005 | Hoy | |
| 6,921,453 B2 * | 7/2005 | Dronzek et al. ............. | 156/270 |
| 2002/0008751 A1 | 1/2002 | Spurgeon et al. | |
| 2002/0025492 A1 * | 2/2002 | Murphy et al. .......... | 430/271.1 |
| 2002/0114878 A1 | 8/2002 | Ben-Yoseph et al. | |
| 2002/0135651 A1 | 9/2002 | Spurgeon et al. | |
| 2002/0168449 A1 | 11/2002 | Summers | |

(Continued)

*Primary Examiner*—Daniel Robinson
(74) *Attorney, Agent, or Firm*—Valauskas & Pine LLC

(57) ABSTRACT

An edible article for acting as a substitute for a food item includes a carrier element formed of an edible material and an information element disposed on one or more surface of the carrier element. The one or more information element includes information related to the food item. The information may be one or more of a flavoring agent, a coloring agent or a texturing agent, for example. Different types and combinations of information may be provided by way of the information element and/or the carrier element to substitute for food items.

1 Claim, 15 Drawing Sheets

U.S. PATENT DOCUMENTS

| | | |
|---|---|---|
| 2002/0170446 A1 | 11/2002 | Willcocks et al. |
| 2003/0034645 A1* | 2/2003 | Dronzek et al. .............. 283/81 |
| 2003/0035870 A1 | 2/2003 | Ackley, Jr. et al. |
| 2003/0097949 A1 | 5/2003 | Candler et al. |
| 2003/0161913 A1 | 8/2003 | Stewart |
| 2003/0198719 A1 | 10/2003 | Stewart |
| 2003/0198720 A1 | 10/2003 | Stewart |
| 2004/0013778 A1 | 1/2004 | Ackley, Jr. et al. |
| 2004/0021757 A1 | 2/2004 | Shastry et al. |
| 2004/0028780 A1 | 2/2004 | Maser et al. |
| 2004/0050289 A1 | 3/2004 | Russell et al. |
| 2004/0086603 A1 | 5/2004 | Shastry et al. |
| 2004/0091594 A1 | 5/2004 | Ackley, Jr. et al. |
| 2004/0101615 A1 | 5/2004 | Barker et al. |
| 2004/0120991 A1 | 6/2004 | Gardner et al. |
| 2004/0197447 A1 | 10/2004 | Coyle |
| 2004/0213878 A1 | 10/2004 | Woodhouse et al. |
| 2005/0037498 A1* | 2/2005 | Ribi .............................. 436/2 |
| 2005/0070607 A1* | 3/2005 | Andrus et al. .............. 514/562 |
| 2005/0084471 A1* | 4/2005 | Andrews et al. ......... 424/70.31 |
| 2005/0238834 A1* | 10/2005 | Bourdelais et al. ........ 428/40.1 |
| 2006/0124239 A1* | 6/2006 | Marshall et al. ............ 156/327 |

* cited by examiner

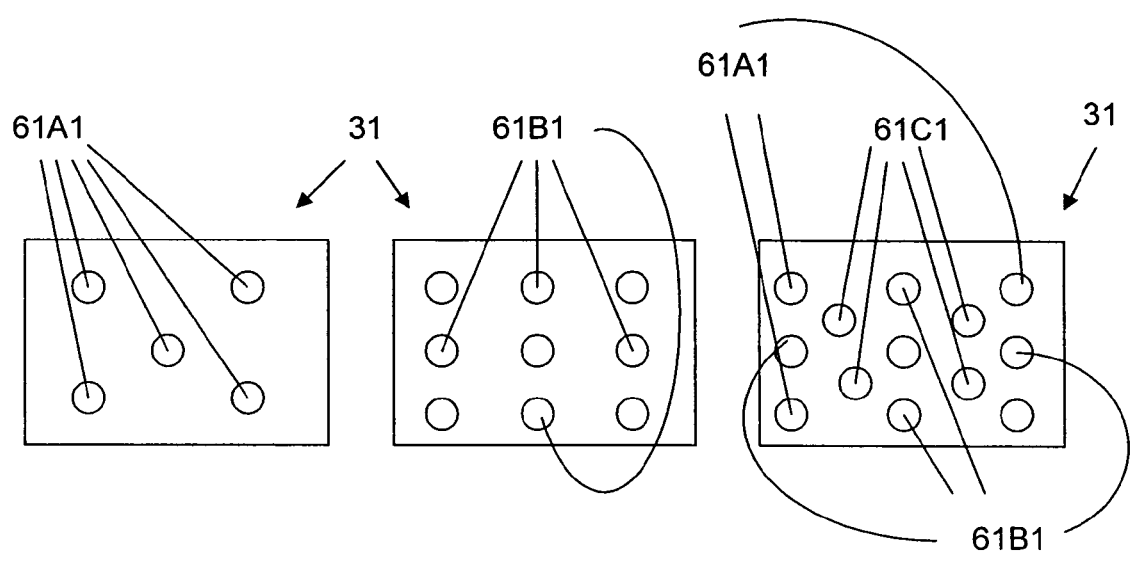
FIG. 11A  FIG. 11B  FIG. 11C

US 7,307,249 B2

SYSTEM AND METHODS FOR PREPARING SUBSTITUTE FOOD ITEMS

This application claims the benefit of U.S. Provisional Application No. 60/614,777 filed Sep. 30, 2004.

FIELD OF THE INVENTION

The present invention generally relates to a system and methods by which an edible item may be prepared. More specifically, the present invention is directed to a system and methods by which an edible item may be prepared that can convey certain information regarding, but not all of the aspects and characteristics of a different food item. Advantageously, the edible item of the present invention is a simplified version of, and can act as a substitute for the other food item. The substitute food item of the present invention may be used, for example, to convey information, such as the flavor, texture, or appearance of, or other aspects or characteristics regarding a food item that given the context in which the substitute food item is to be used, cannot be prepared, stored, or served, or which consumers are unable to ingest because of health, dietary, or other recommendations or restrictions.

BACKGROUND OF THE INVENTION

Food items are typically prepared through the application of one or more food preparation techniques or cooking processes to one or more food components including slicing, peeling, grating, mashing, aging, fermentation, cooling, or freezing or warming, steaming, boiling, roasting, sautéing, frying, grilling, barbecuing, or broiling. While a consumer may wish to ingest the food item, the consumer may be unable to do so because the consumer does not have the necessary food components or the time, means, or skill to apply the necessary techniques to prepare the food item.

Because of the organic origin of some or all of the its components, the freshness of a food item typically degrades in quality with time. Once prepared, a food item typically must be stored in some way to permit it to be consumed as intended. To slow the degradation process, and in order to maintain freshness, food items are typically placed in closed or sealed containers, and/or stored or maintained to lessen the exposure of the food items to uncontrolled environmental conditions. Conditions at times do not permit the use of such protective storage. As a result, consumers are prevented from ingesting the food item.

Certain food items may be unknown or unfamiliar to consumers. Consumers may wish to try such one of such food items but are reluctant or unable to do so because, for example, of the difficulty in preparing or cost of the food item, or the general unavailability of the food item to the consumer. Promoters may wish to introduce of a new food item to consumers but, given the size of the target group, cannot afford to actually prepare and serve a sample of the actual food item to each member of the group.

Other food items may be familiar, possibly all too familiar to certain consumers. Due to dietary or health restrictions, the consumers are required to avoid these food items. Given the lack of availability of a non-restricted version of the food item, consumers satisfy their craving for a given restricted food item by ingesting it, contrary to the advice they receive or even their better judgment. Religious or other restrictions may prevent a consumer from ingesting a food item.

Consumer may wish to have certain food items that can be prepared and served with one or more food items that may not be available. Other food items may have a characteristic such as a taste, flavor, or texture that a user may wish to mask or heighten through the use of one or more food items that may not be generally available.

It is clear that there is a demand for a version of food items that conveys certain information about the actual food item but does not have the preparation, storage characteristics, risks, or restricted components associated with the food item. The present invention satisfies these various demands.

SUMMARY OF THE INVENTION

The system of the present invention includes a substitute food item. The term "substitute food item" (and variations of this term) for purposes of this application means an edible item by which certain information about a food item can be conveyed to consumers without necessarily requiring the preparation or service of the food item. The food item that is being simulated through the use of the substitute food item is any item that may be consumed as food, drink, or a nutritional or health supplement. The term "information" or "sensory information" for purposes of this application means actual sensory or organoleptic aspects, features, or characteristics of the food item including the color, texture, flavor, smell or appearance of the food item or the arrangement of the food components that form the food item. Relative to the actual food item, the substitute food item is of a simplified construction that permits a user to convey information about a food item to consumers in a variety of contexts in which the food item may not necessarily be able to be prepared, stored, or served. Certain embodiments of the substitute food item may be prepared from simplified components that may not have the storage and maintenance requirements associated with the food item. The substitute food item may also take into consideration and alter, modify, mask, or balance certain aspects or features of the actual food item that are not necessarily desirable.

One embodiment of the substitute food item according to the present invention includes a carrier element and an information element. The carrier element is of a composition that it is edible. The carrier element may be of a simplified construction and form—such as in the shape of a sheet. The carrier element may be made of one or more edible material, including but not limited to carbohydrates, fats, proteins, and gels.

Embodiments of the carrier element do not necessarily convey information about a food item but simply function as a substrate or layer on which the information element is placed and are intended, at the very least, not to mask the information that is to be conveyed through the information element. Other embodiments of the carrier element may impart organoleptic information about a food item, such as one or more flavors, textures, or colors. These information conveying embodiments of the carrier element are intended to interact or combine with the information conveyed by the information element to produce a desired combined flavor when the substitute food item is ingested separately.

The information element of the substitute food item according to the present invention conveys "sensory information" or "organoleptic information" about a food item such as the color, texture, flavor, or appearance of the food item or the arrangement of the food components that form the food item. The information element may also take into consideration a feature or aspect of a food item that may not necessarily be considered desirable by consumers and include an aspect, feature, or quality that masks, alters, or balances the given feature or aspect. The information element is of a composition and consistency such that it preferably can be applied to and generally retained on an outer surface of the carrier element. The information element may be formed separately and generally as a unit applied to and fixed to the carrier element. Fixation may be facilitated through a variety of means including the use of edible substance that acts as an edible adhesive. Depending on the intended use of the substitute food item, the information element may be formed also through the use of a liquid having a composition and consistency that permits it to be sprayed, rolled, or swabbed onto the outer surface of the carrier element. The carrier element may also be conveyed or positioned in relationship to the information element such that the carrier element may be dipped in and retain the desired liquid to form the information element. Alternatively, the liquid intended to form the information element may be poured over the carrier element. The surface of the carrier element may be treated to facilitate the formation of the information element. For example, drying permits the liquid used to form the information element to assume a relatively stable position relative to the carrier element. Among the other forms of the information element are those that are in powder or particulate form, thereby permitting the information element to be formed, for example, by dropping, blowing, or sifting the material from which the information element is formed onto the carrier element.

One or both of the carrier and information elements may include a hydrocolloid emulsion including a water and/or oil soluble flavoring. The hydrocolloid may be in a gel form which is separate from the carrier element and information element.

The substitute food item may provide information regarding the food item through the use of, for example, certain, but not all components of the food item, derivatives of components of the food item, or artificial substitutes for components of the food item. Those aspects or characteristics that the substitute food item does not include may be those which a consumer cannot ingest for health, dietary, religious, or other reasons or those which cause the food item to spoil or lose characteristics inherent to the given type of food or can only be produced through cooking or processing that, for whatever reason, cannot be provided in the context in which the substitute food item is to be used.

Additional embodiments of the present invention include more than one carrier element and/or more than one information element. Each such element may include one or more aspects or characteristics of a certain food item or a group of such food items, thereby providing a user with flexibility as to which one or more aspects, features, or characteristics of the food item or group of food items the user wishes to convey to consumers through the use of the substitute food item.

One advantage of the substitute food item of the present invention is that it permits, for example, the flavor or texture of or other information concerning a food item to be conveyed to consumers without the actual preparation, storage, or service of the food item.

Another advantage of the substitute food item of the present invention is that it permits consumers to ingest a version of a food item that the consumers are unable to consume because of health, dietary, religious, or other restrictions and thereby satisfy an interest (or cravings) that the consumers have for the food item.

A further advantage of the substitute food item of the present invention is that it permits consumers to acquaint themselves with food items which they may have never ingested before because of the general lack of availability or time or cost associated with the preparation or service of the food item.

An additional advantage of the substitute food item of the present invention is that it permits a user to introduce or promote the use of or advertise the purchase of a food item, in environmental or business conditions that do not necessarily permit the preparation or service of the actual food item. This condition may include magazines, consumer and/or trade shows, street level marketing, direct mail, and so on.

A primary object of the present invention is to provide an edible item that can substitute for an actual food item.

An additional object of the present invention is to provide methods of preparing an edible item that can substitute for an actual food item to a certain intended degree.

BRIEF DESCRIPTION OF THE DRAWINGS

The preferred embodiments of the invention will be described in conjunction with the appended drawings provided to illustrate and not to the limit the invention, where like designations denoted like elements, and in which:

FIG. 11A is an overhead view of an embodiment of the carrier after the application of the information material 51A1 according to the system shown in FIG. 10A;

FIG. 11B is an overhead view of an embodiment of the carrier after the application of the added information material 51B1 according to the system shown in FIG. 10B;

FIG. 11C is an overhead view of an embodiment of the carrier after the application of the additional information material 51C1 according to the system shown in FIG. 10C;

DETAILED DESCRIPTION OF PREFERRED EMBODIMENTS

Figure 1:
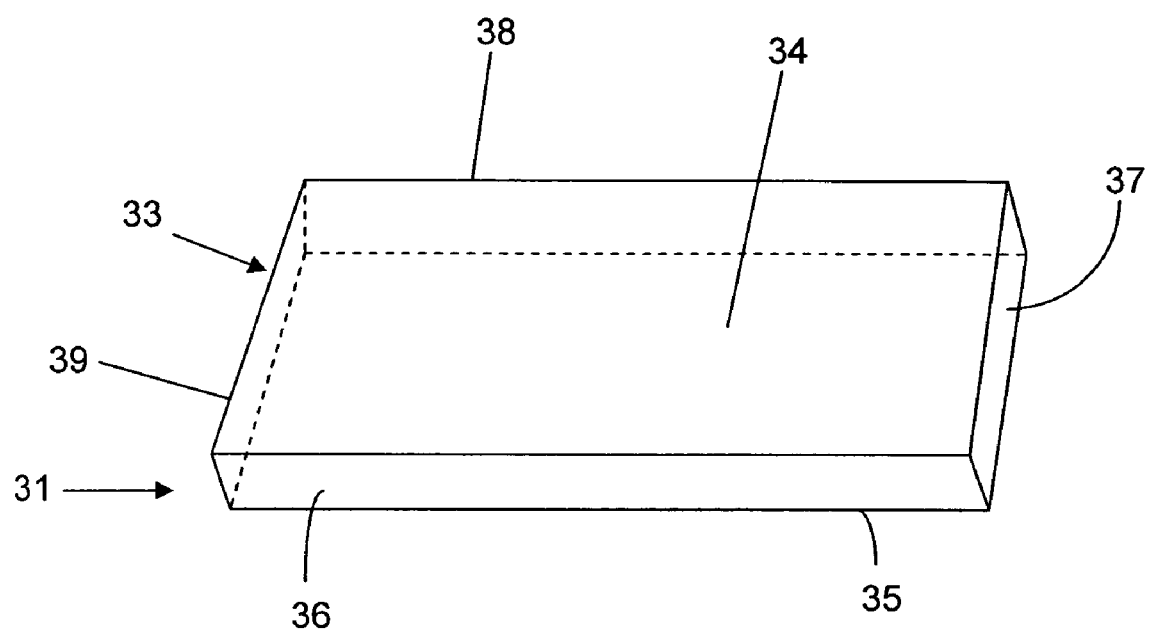
FIG. 1 is a perspective view of one embodiment of a carrier element of a substitute food item according to the present invention.

A substitute food item according to the present invention is shown and identified in the accompanying drawings as 21. The substitute food item 21 generally includes a carrier element 31 and an information element 61.

Carrier element 31 is of a structure and has a composition such that the carrier element 31 can accept at least the information element 61. Carrier element may be of a generally uniform composition of a certain type of edible substance or a mixture or conglomeration of edible substances. Substances from which the carrier element 31 may be made include a variety of starches including soybean starch, modified food starch, corn starch, rice starch, alginate starch, cassaya, tapioca, or potato starch. So that these substances can be formed into and function as the intended carrier element 31, other substances may be added, such as water, food gums, salt, rapeseed oil, microcrystalline cellulose, various forms of hydrocolloid emulsions, maltodextrin, dextrose, or other sugars, for example. In certain embodiments of the carrier element composed largely of one or more starch compositions it is preferred that sufficient water or vegetable oil is included to avoid cracking or failure of the carrier element. A carrier element 31, having relatively higher moisture content permits the shape of the carrier element to be formed and/or adjusted in size and shape. Advantageously, by varying the type of starch, the texture of the carrier element 31 may be controlled. For example, tapioca starch provides a fine-grained structure to a carrier element 31 formed therefrom.

Embodiments of the carrier element 31 may include no information about a food item and function largely as a substrate for the information element 61. Alternatively, the carrier element 31 may include information about the food item. For example, the carrier element 31 may include a natural or artificial flavoring, or a texture, or a color largely identical or reminiscent of the food item. At the very least, whatever information is carried by the carrier element 31 does not mask, and preferably supports the information carried by the information element 61.

While the carrier element 31 may be formed from a largely homogenous mixture of processed food substances, the carrier element may include also portions of food substances that did not result from extensive processing. For example, the carrier element 31 may include small portions of a food obtained by chopping, slicing, shredding, or mashing a food. These small portions may be included in a mixture with the processed food—such as a starch-based mixture—to permit the carrier element to be formed easily.

In further embodiments, the either or both the carrier element 31 and information element 61 may include vitamins, sweeteners, hygroscopic agents, binders, medicaments, bulking agents, fillers and other food adjuncts or additives.

The use of a starch based composition for the carrier element 31 advantageously allows the carrier element 31 to be easily formed in a variety of shapes and sizes. While the carrier element 31 as well as the information element 61 are shown in the accompanying drawings as being in a similar sheet-like size and shape, the carrier element and information element may be formed in different sizes and shapes.

To facilitate the use and/or formation thereof, including the shaping of the carrier element 31 and thereby the entire substitute food element 21, the carrier element 31 may include use components 49 (see FIG. 2) which function to support the carrier element during and/or after formation thereof. Use components 49 include structural elements 49A which may be in the form of a web, lattice, sheet, basket, network, and the like that facilitate the use of, for example, the carrier element 31, and thereby the substitute food element 21. An example of a use component 49A would be a web of compressed food starch for supporting the relatively less dense carrier element 31 that permits the carrier element 31 to be placed in a certain configuration during processing and retained therein afterwards. The carrier element 31 may thus be held in position and supported during the application of information 51 by mechanism related to a silk screening or sifting process (not shown), for example.

To facilitate the conveyance of the carrier element 31 through a non-manual processing step in which the information material 51 from which the information element 61 is formed is placed on the carrier element 31, for example, through a printing or spraying process, a carrier element 31 having a generally planar shape may be particularly advantageous. The spraying process may include a fluid with solids based on edible materials including carbohydrates, food gums, aldetols, sugars, starches, proteins, fats, emulsifiers, and ethanol. These materials may be used to adjust the viscosity of the fluids used in printing or spraying of the information materials 51. The ethanol may be included to speed up drying.

An example of a planar shaped carrier element 31 is illustrated in the accompanying drawings. The illustrated embodiment of the carrier element 31 includes an outer surface 33 including opposing major surfaces 34 and 35 and edge surfaces 36, 37, 38, and 39 (see FIG. 1).

The information element 61 conveys "information" and in particular may convey sensory or organoleptic information about a separate food item such as the color, texture, flavor, or appearance of the food item or the arrangement of the food components that form the food item. For example, if the substitute food element 21 is to convey information about an actual food item, a lemon cake, for example, the information element may have a lemon yellow color and natural or artificial flavoring that conveys a lemon flavor. The information element 61 may be supported on a carrier element 31 largely without flavor but with possibly additional information such as a texture that approximates the texture of the lemon cake. If the separate food item is a lemon cake having coconut frosting, the substitute food item 21 may include an information element 61 having, in addition to a yellow color and a lemon flavor, a natural or artificial coconut flavoring. The information element 61 may also have a texture that in part has a "mouth feel" of shredded coconut. Alternatively, the carrier element 31 may have a texture that conveys the "mouth feel" of shredded coconut. Each of these flavors and the texture may be formed within a single information element 61 that, for example, is applied to the outer surface 33 of the carrier element 31. As discussed below, embodiments of the substitute food item may include a plurality of information elements or carrier elements, each of which may include certain but not all of the information of a food item.

When certain information about the food item may not necessarily be desirable, but is included within the substitute food item to in order to more closely simulate the food item, the information element 61 (or carrier element 31) may include aspects, features, or qualities to alter, modify, or partially mask the non-desirable feature. For example, if a food item has a "gamey" taste, while the substitute food item 21 may have an artificial flavor that mimics the "gamey" taste it may include another flavor that is intended to at least partially mask the flavor of the food item.

Rather than including all of the information that the user wishes to convey about a food item in a single information element 61, one or more characteristics, features, or aspects may be included in separate information elements and the information elements joined together and positioned on the carrier element 31 to form the substitute food item 21. Such embodiments permit one or more substitute food items to be prepared of one or more of food items within a larger group of food items to be formed as needed and quickly.

Figure 6:
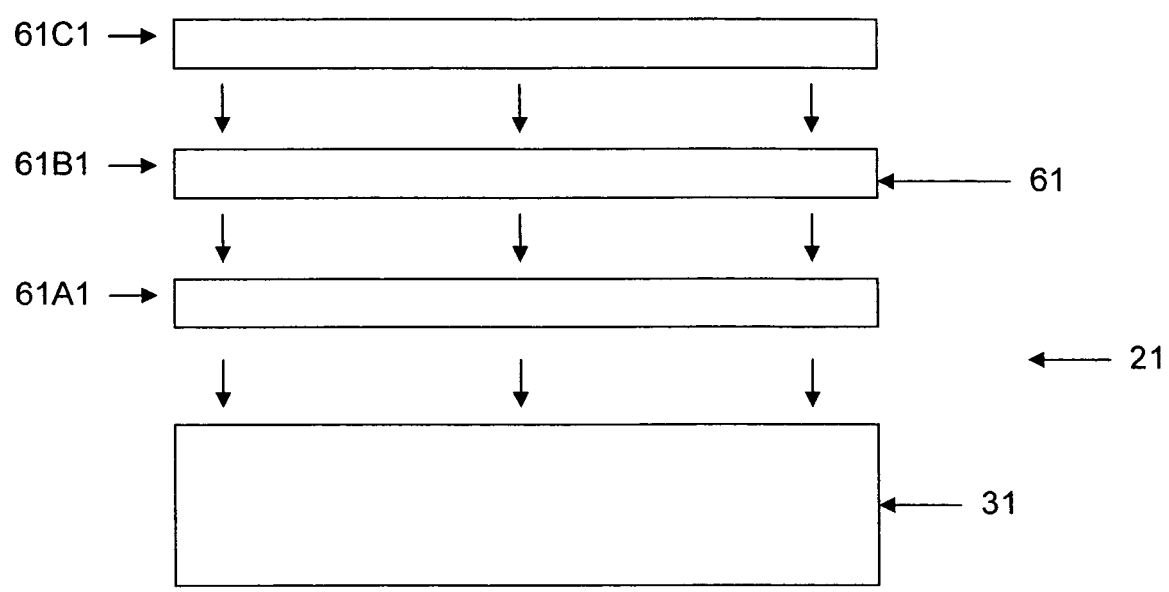
FIG. 6 is a side view of an additional embodiment of a substitute food item including a plurality of information elements and a carrier element according to the present invention.

For example, and with reference to FIG. 6, if a user wishes to be able to prepare substitute food items of one or more food items that are related in that each has one flavor in common—such as different types of lemon cake—, the lemon flavor may be included in one information element 61A1, while the other aspects by which the other members of the group of lemon cakes are distinguishable may be included in separate information elements. The texture information of the other food items within this group of food items may be included in another and separate information element 61B1, while some other characteristic of the separate food item (such as color) may be included in additional information element 61C1, etc. The information elements 61 may joined or adhered together to form a single information element 61. This separation of information of the food item into separate information elements allows different food items to be "constructed" by selection and joining of separate information elements together.

Figure 8:
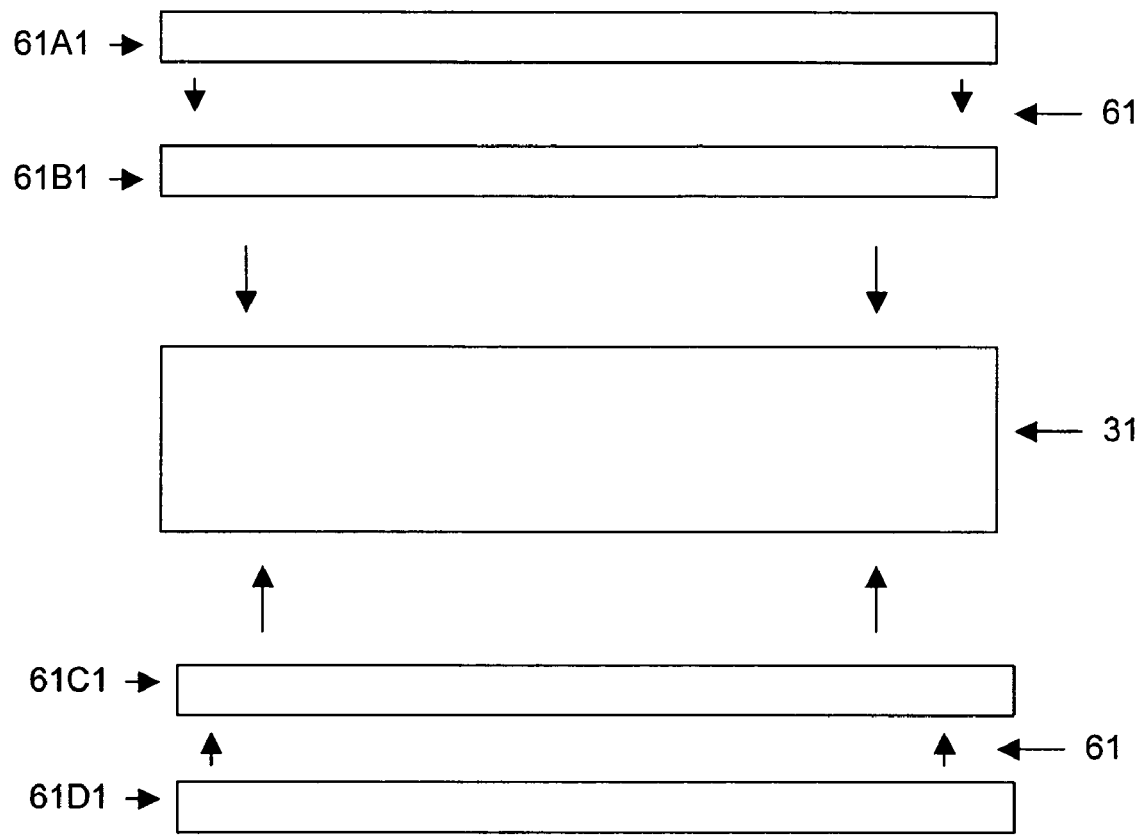
FIG. 8 is a side view of an a further embodiment of a substitute food item including two information elements positioned below and two information elements positioned above a carrier element according to the present invention.

As a further example of the use of the present invention to form a substitute for a food item, a version of lemon cake with butter crème frosting can be formed, for example, and again with reference to FIG. 6, from an information element 61A1 that is yellow in color, an information element 61B1 that includes a natural or artificial lemon flavoring, and, an information element 61C1 that provides possibly the flavor and/or smooth "mouth feel" of butter crème icing, all of which are joined together and positioned on the carrier element 31. Another food item within the group of lemon cakes—for example, a lemon cake with coconut butter crème frosting—may be formed, for example, and with reference to FIG. 8, from an information element 61A1 that is yellow in color, an information element 61B1 that includes a natural or artificial lemon flavoring, an information element 61C1 that has the smooth "mouth feel" of butter crème frosting, and an information element 61D1 that has a natural or artificial coconut flavor. This embodiment may include an additional information element 61E1 (not shown in FIG. 8) that provides a texture with a mouth feel similar to that of shredded coconut. Alternatively, the texture of shredded coconut may be simulated in the carrier element of this embodiment. All of these information elements 61 may be joined together in one group and placed on the carrier element 31.

Figure 7:
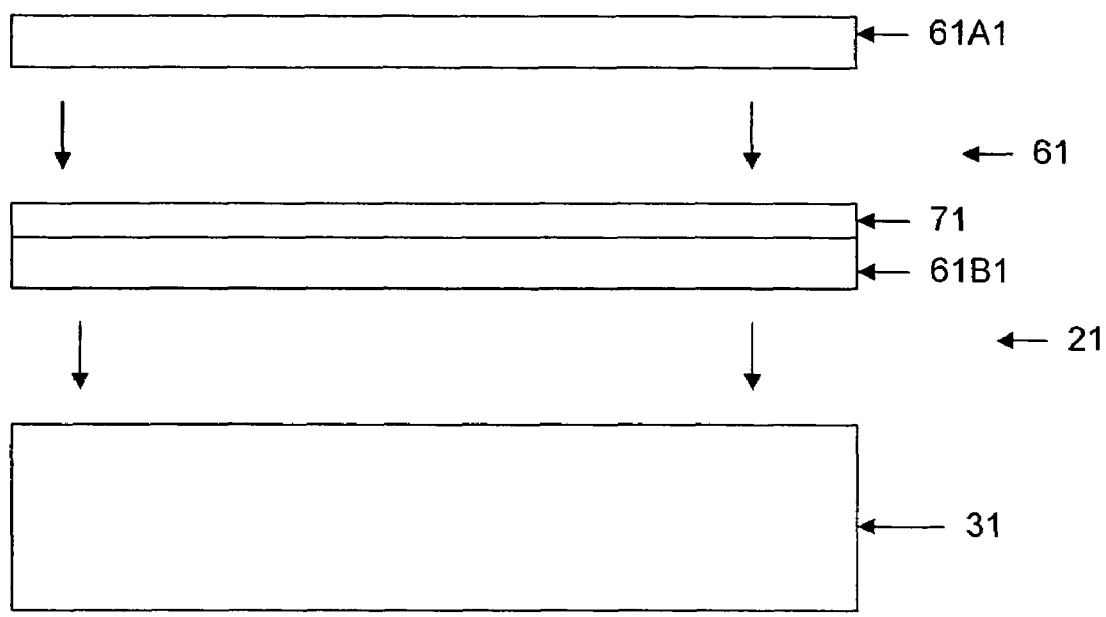
FIG. 7 is a side view of an added embodiment of a substitute food item including a carrier element and two information elements with a binding element therebetween according to the present invention.

In many applications, where the information element 61 is positioned on the carrier element 31 is not of particular importance. However, in certain applications, the information elements 61 whether in single form or in multiple form, such as information elements 61A1, 61B1, etc. may be positioned on the carrier element to further simulate the actual food item. For example, if the food item that is to be simulated by the substitute food item 21 is the alcoholic drink "margarita", one information element—such as 61A1—may include at least a grainy texture that simulates the salt that is often placed on the rim of the glass in which the drink is served while the flavor of the drink may be included in one or more additional information elements 61B1, 61C1, etc. FIG. 7 shows an embodiment of a substitute food item that may be used to simulate a margarita in which information element 61A1 has a grainy texture, and possibly a salty flavor, while the remaining flavor of the drink is included in information element 61B1. The two information elements 61A1 and 61B1 may be joined together with an edible adhesive layer 71 and the information element 61 is placed on the carrier element 31.

Figure 9:
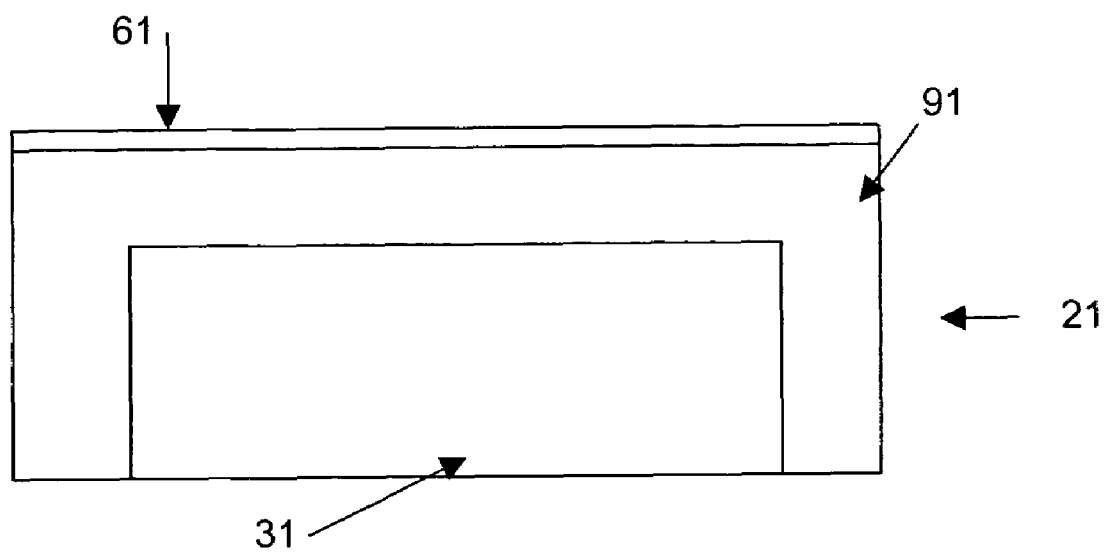
FIG. 9 is a side view of an added embodiment of a substitute food item including a hydrocolloid emulsion surface over a carrier element on which is positioned an information element according to the present invention.

FIG. 9 shows an embodiment of a food substitute 21 wherein the carrier element 31 is coated or attached to a gel layer 91. The gel layer 91 may be a hydrocolloid gel, including food flavorings, sweeteners or other materials 51. An information element 61 is attached to the gel layer 91. The gel layer 91 may function to promote adherence or binding of the information element 61 to the carrier element 31. The combined carrier element 31 and gel layer 91 may be processed to promote adherence, for example, by steaming or other treatments.

Figure 5:
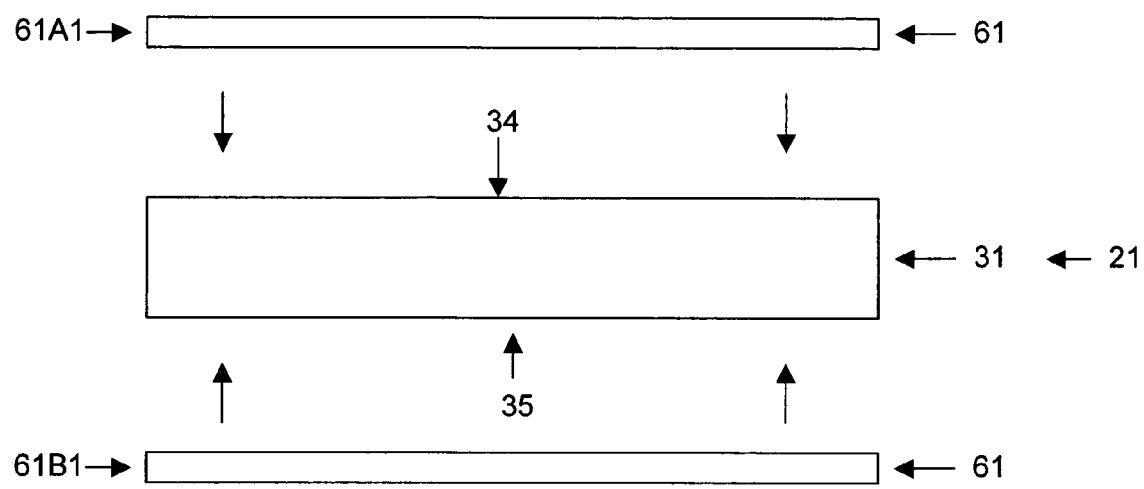
FIG. 5 is a side view of another embodiment of a substitute food item including two information elements and a carrier element according to the present invention.

FIG. 5 shows an embodiment of a food substitute item 21 in which one information element 61A1 is carried on an upper surface 34 of the carrier 31 while another information element 61 B1 is carried on the lower surface 35 of the carrier 31. Such positioning may assist in the simulation of a food in which separation of strong flavors or textures in a food item is known. For example, and with reference to FIG. 5, information element 61A1 may provide a lemon color and flavor, the carrier element may have a texture simulating that of a cake, while information element 61 B1 may have a smooth texture and crème flavor, thereby creating a substitute for a crème filled lemon tart.

The information element 61 is of a composition and consistency such that it preferably can be applied to and generally retained on an outer surface of the carrier element 31. The information element 61 may be formed separately and as a unit applied to and fixed to the carrier element. Fixation may be facilitated through a variety of means including the use of edible substance that acts as an edible adhesive. Depending on the intended use of the substitute food item, the information element may be formed also through the use of a liquid having a composition and consistency that permits it to be sprayed, rolled, or swabbed onto the outer surface of the carrier element.

Figure 10A:
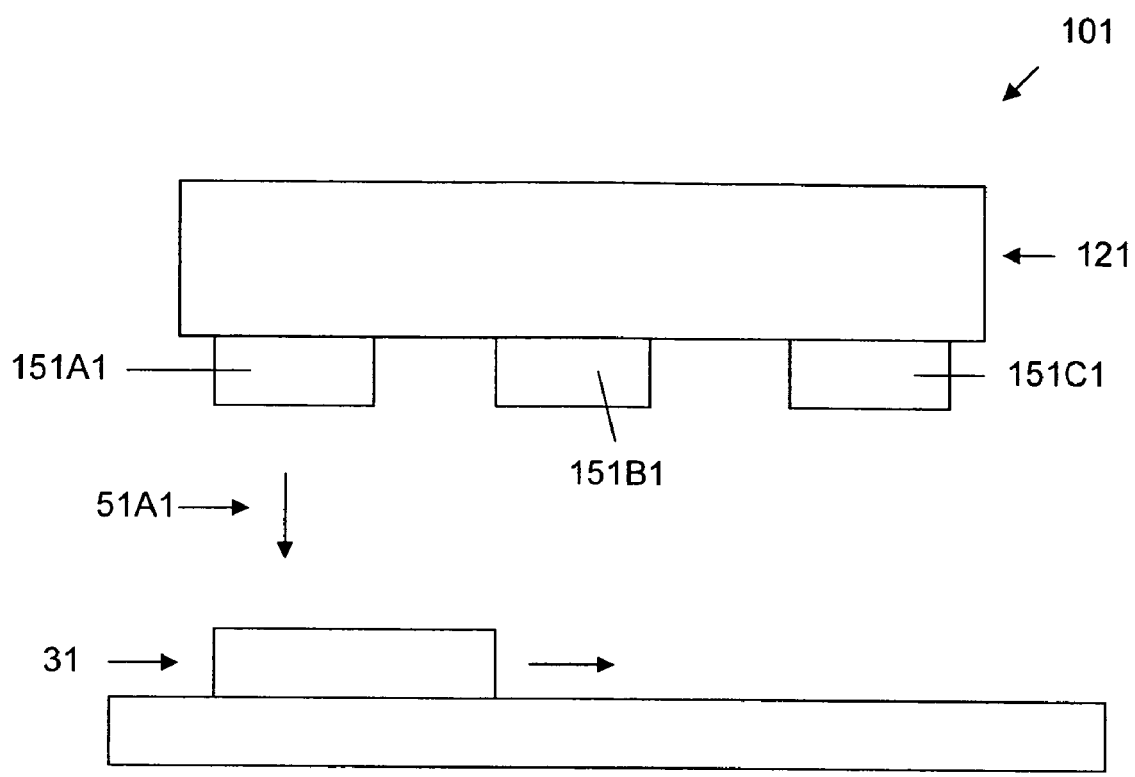
FIG. 10A is a side view of an embodiment of a system by which certain information material may be applied to a carrier element to form a substitute food item according to the present invention.
Figure 10B:
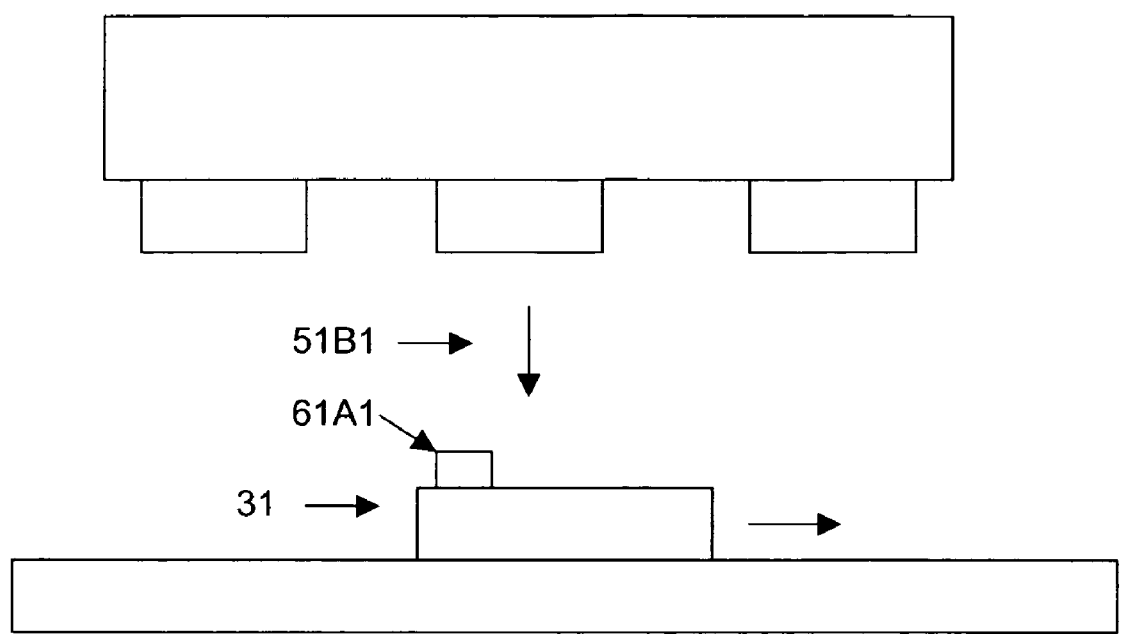
FIG. 10B is a side view of an embodiment of a system by which certain additional information material may be applied to a carrier element to form a substitute food item according to the present invention.
Figure 10C:
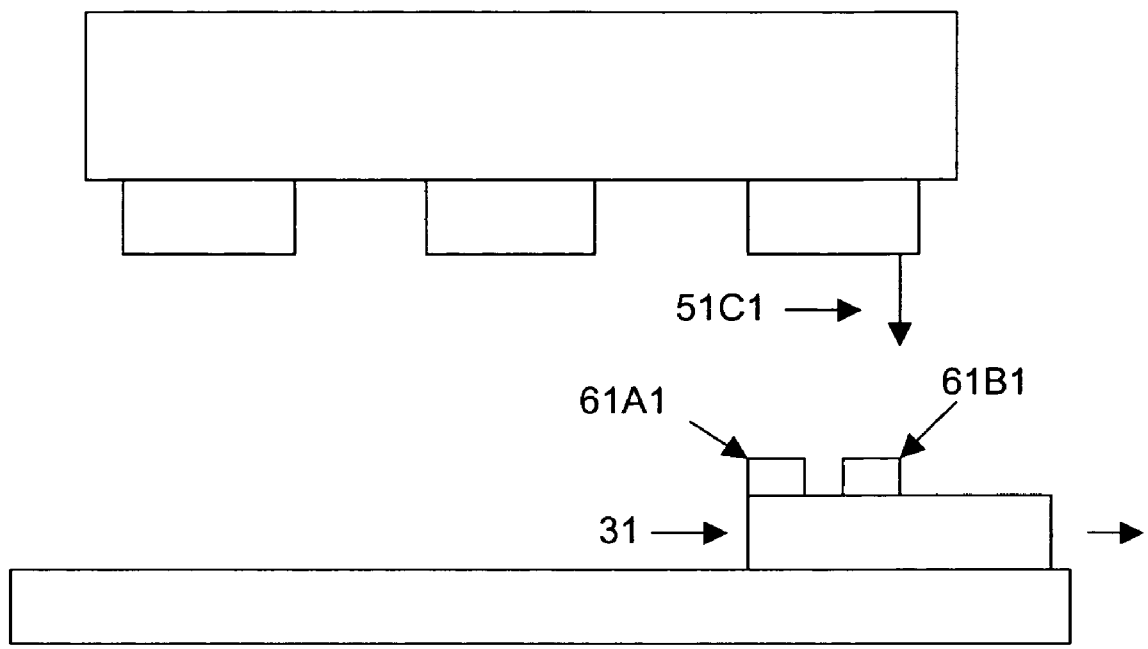
FIG. 10C is a side view of an embodiment of a system by which certain added information material may be applied to a carrier element to form a substitute food item according to the present invention.

FIG. 10A, FIG. 10B, and FIG. 10C show one method 101 by which information material 51 may be applied to form an information element 61 on a carrier element 31. Specifically, the method permits different information material to be applied to the carrier in a sequence. FIG. 10A shows information material 51A1 being discharged from one discharge unit 151A1 included within the application system 121 onto carrier 31. The system 121 may be a printing system, a silk screen system, or a system by which the information material 51A1 is applied in a dry form, for example by sifting onto the carrier element 31. FIG. 10B shows information material 51B1 being discharged from a second discharge unit 151B1 (see FIG. 10A) included within the application system 121 onto the carrier 31 which has been moved from a position below the discharge unit 151A1 to the new second position under the discharge unit 151B1 either manually or automatically such as through a conveyor system. FIG. 10C shows information material 51C1 being discharged from a third discharge unit 151C1 (see FIG. 10A) included within the application system 121 onto the carrier which has already received material 51A1 from discharge unit 151A1 and material 51B1 from discharge unit 151B1 and has been moved into the new third position manually or by a conveyor-like process.

FIG. 11A, FIG. 11B, and FIG. 11C show the results of the use of the method 101 shown in FIG. 10A-10C. While the information material 51A1, 51B1, 51C1 may be applied in each step to form individual layers 61A1, 61B1, and 61C1 on the carrier element 31, the information material 51 may be applied to form less continuous sections including as the individual sections shown in FIGS. 11A-C.

The carrier element 31 may be of a generally uniform composition such that the outer surface 33 facilitates the retention of the information element 61 thereon. For example, the carrier element 31 may be of a composition that is not relatively dense but rather one providing a generally lightweight, porous structure so that the outer surface is similarly relatively porous, and therefore capable of better retaining certain types of materials 51 used to form the information element 61 thereon.

Returning to FIG. 1, the outer surface 33, or one or more of the major surfaces 34, 35 or edge surfaces 36, 37, 38, 39 thereof may be of a texture or treated or processed to facilitate the receipt and retention of the material 51 from which the information element 61 is formed. For example, the outer surface 33 may include adhesive properties as a result of applying heat, steam, pressure, and adhesive adjuncts to the carrier element 31. The adjuncts added to the surface 34 or incorporated into the carrier element 31 may be inherently sticky or tacky, or caused to sticky or tacky and may include food gums, hydrocolloids, oils, starches, proteins, cellulosics, sugars, fats, etc.

Figure 2:
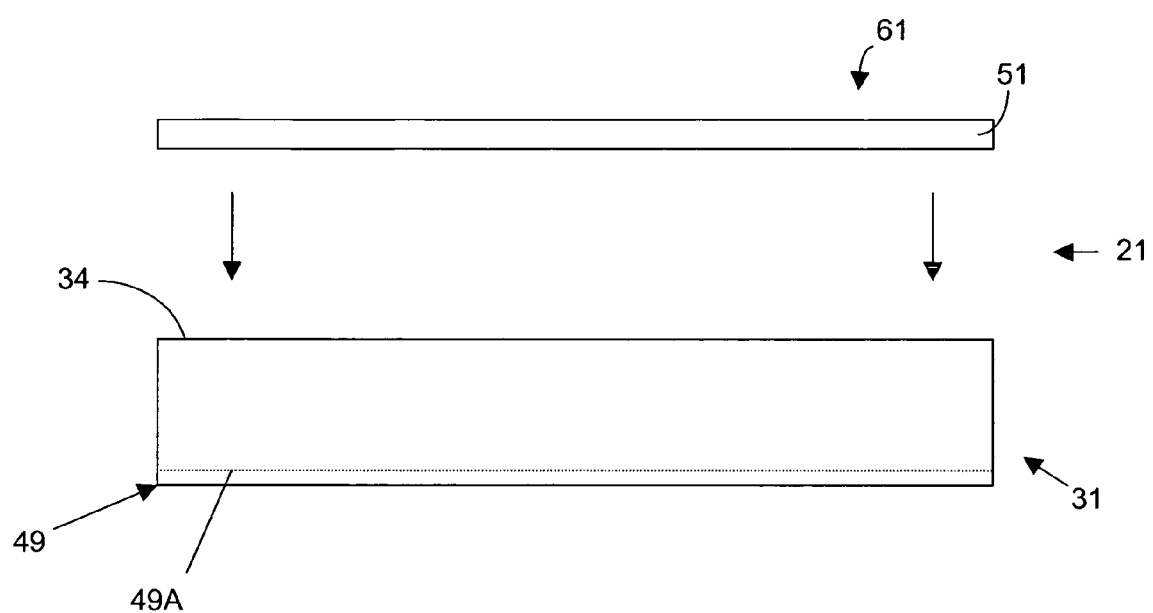
FIG. 2 is a side view of an embodiment of a substitute food item according to the present invention.

FIG. 2 illustrates the positioning of the material 51 from which the information element 61 is formed on major surface 34. While the discussion in the following will be in terms of providing an information element 61 on one surface 34 of the carrier element 31, the carrier element 31 may be of a composition and treated, and the information element 61 may be of a composition and treated such that an information element may be placed on one or more of the surfaces 34-39 (see FIG. 1). It will also be understood that the carrier element 31 may be one or more carrier element and the information element 61 may be one or more information element as desired, some examples of which are described herein.

Figure 3:
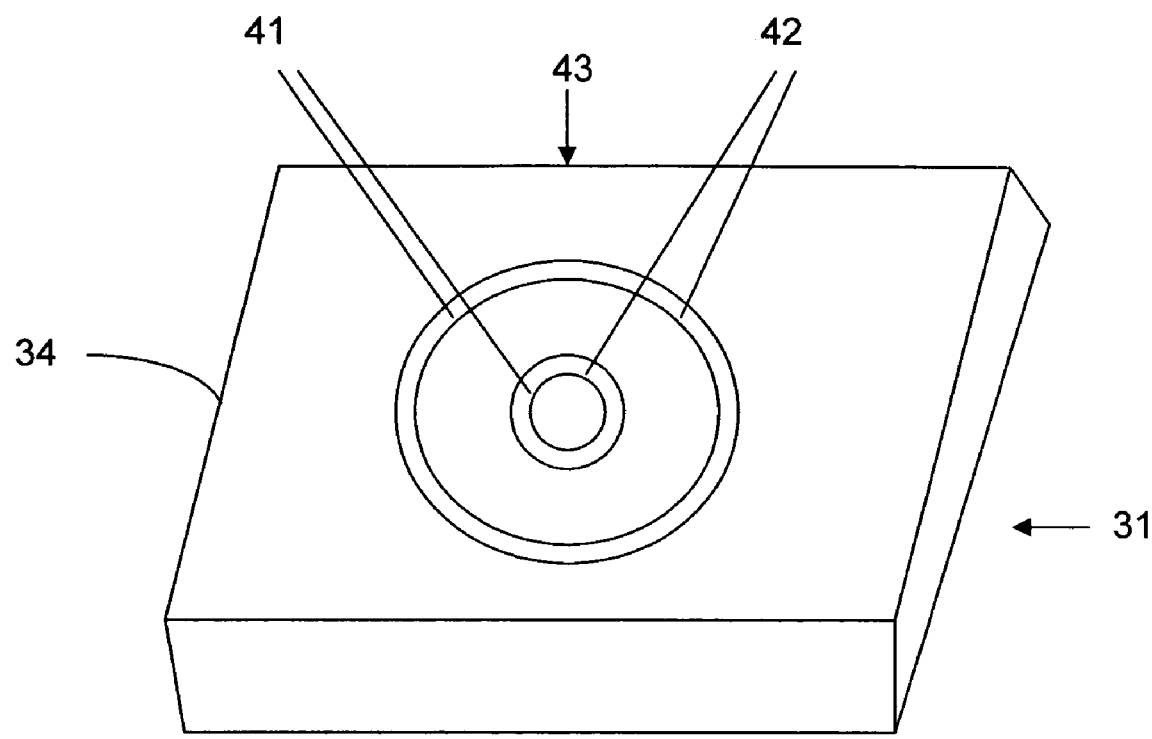
FIG. 3 is a perspective view of another embodiment of a carrier element showing positive surface elements and positive surface area according to the present invention.

In one example, FIG. 3 illustrates a carrier element 31 whose major surface 34 is treated such that positive surface elements 41 are formed thereon, and thereby a positive surface 43. For simplicity purposes, FIG. 3 shows how an image of two concentric circles that may be formed on the outer major surface 34 through the use of positive surface elements 41. However, information elements 61 having more complex imagery than that shown in FIG. 3 may be formed on the major outer surface 34 through the use of positive surface elements 41. The same or other imagery may be formed on any of the other major or edge surfaces 35-39 (see FIG. 1) through the use of positive surface elements 41. Positive surface elements 41 are those that facilitate the placement and retention of the information material 51 in and on the outer surface 33 of the carrier element 31 to form the positive surface 43.

In order to form positive surface elements 41, for example, on the major outer surface 34, the major outer surface 34 may be treated according to a variety of methods. Treatment, for example, may include applying surface material 42 to the surface 33. Such surface material from which the positive surface elements 41 may be formed may include that having a generally adhesive or sticky quality. Information material 51 can be of a composition and state such that when it is placed on surface material 42 the information material 51 generally adheres to or combines with the surface material 42. For such treatment, information material 51 may be in the form of a powder or spray and directed to make contact with the surface material 42 from which the positive surface elements 41 are formed. A material 51 having such a powdery or sprayable consistency would tend to adhere to the surface material 42 forming the positive surface element 41. With the elimination of any material 51 that did not adhere in such fashion, an information element 61 having the desired image will be formed on the outer surface 33 and not elsewhere.

Treatment of the outer surface 33 (or other of the surfaces 35-39) to define the positive surface elements 41, and thereby the positive surface area 43 for retention of the information material 51 thereon, can include also mechanical treatment of the outer surface 33 such as by abrading those areas that are to be the positive surface areas 41. Abrasion makes the areas 43 more porous than the remaining portions of the outer surface 33, and thereby facilitates the retention of certain types of information material 51 thereon. Fine-grained material 51 that is later processed to form a generally durable information element 61 may be used with such treated carrier elements 31.

Figure 4:
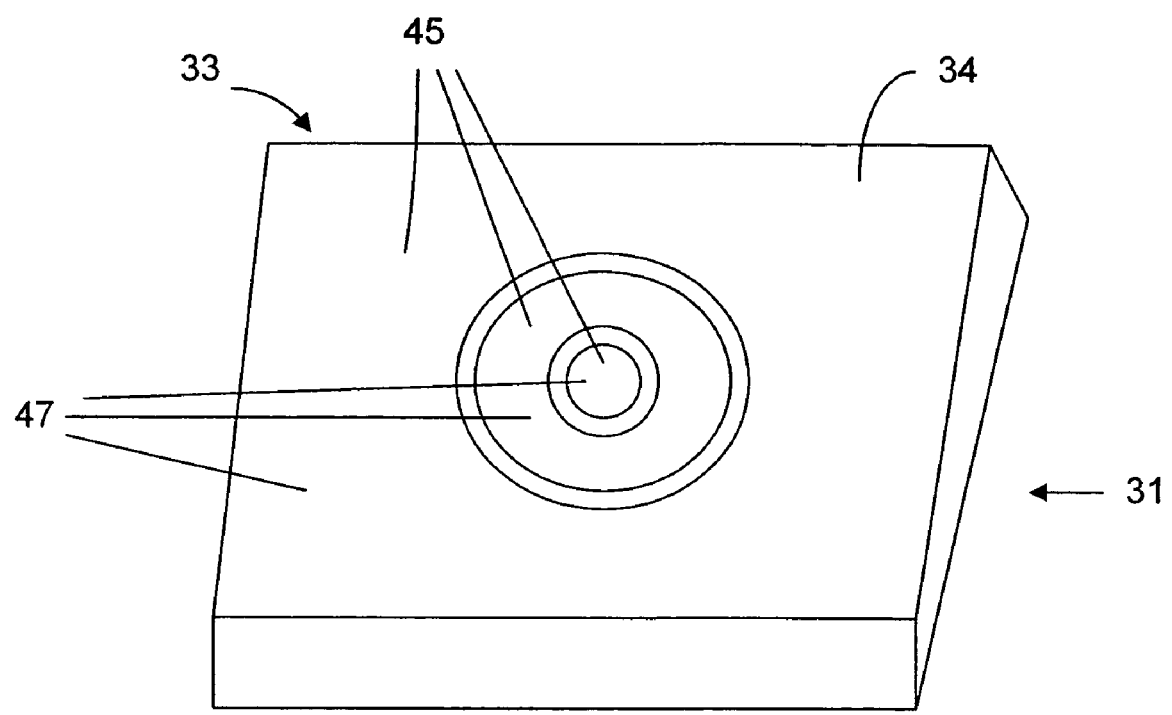
FIG. 4 is a perspective view of an additional embodiment of a carrier element showing negative surface elements and a negative surface area according to the present invention.

Alternatively, the carrier element major may include an outer surface 33 that is treated such that negative surface elements 45 are formed thereon and thereby a negative surface area 47. Again, and for simplicity purposes, FIG. 4 shows how an image of a hollow circle may be formed on the major surface 34 through the use of negative surface elements 45. However, information elements 51 having more complex imagery than that shown in FIG. 4 may be formed on the outer surface 33 through the use of negative surface elements 51. Negative surface elements 51 are those that facilitate the placement and retention of the information material 51 in and on areas of the outer surface 33 outside the area 47 defined by the negative surface elements 45. In order to form negative surface elements 45, for example, on the major outer surface 34, the major outer surface 34 may be treated according to known methods. For example, a material—such as one that generally does not mix with a water based material—may be applied to the area 47 defined as the negative surface elements 45, thereby permitting only the area of the major outer surface 34 not so defined to accept the information material 51. One material by which the negative surface elements 45 and the negative surface area 47 may be formed includes an oil or oil-based material having sufficient viscosity such that it remains generally in the area 47.

The outer surface 33 may also be treated to define the positive surface elements 41 and thereby the positive surface area for retention of the information material 61. Such treatment includes mechanical treatment such as compressing the carrier element by the application of pressure on the negative pressure area 47, thereby making it more generally less porous than the remaining portions of the outer surface 33, and thereby less receptive to information material 51 that when appropriately composed and applied, will adhere to more porous areas. Compressing the carrier element 31 to give it an "embossed look" advantageously permits the formation of "3D" like effects on the surface. For example, this process may include stamping and pressing steps. Multiple information elements 61A1, 61B1, etc. (see FIGS. 10A-C) may be joined together through a variety of mechanisms and means.

Flavorings that may be included within an information element 61 or carrier element 31 can include natural or artificial flavorings in liquid form and/or solid form and other flavorings as onion powder, soy powder, tomato powder, or various agents that provide fragrance or perfume. Flavorings or additives when applied in dehydrated form to a carrier element 31 may be used in conjunction with some moisture to promote adherence to the carrier element 31. The carrier element 31 and information element may be processed through a variety of methods including frying, smoking, or texturing.

Figure 12:
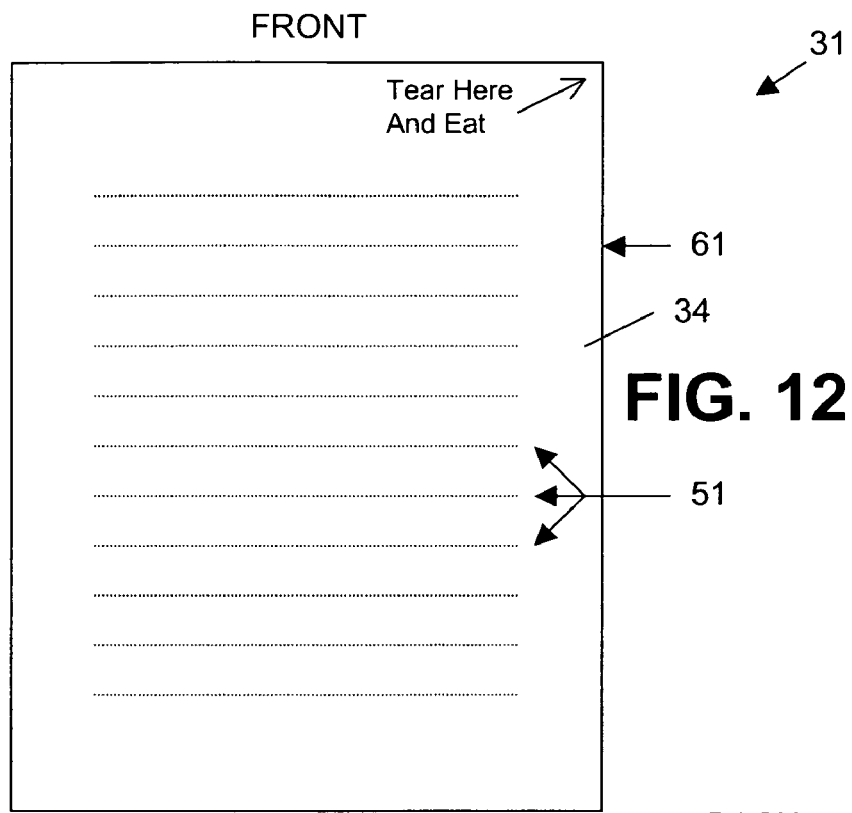
FIG. 12 is a front view of an embodiment of a substitute food item according to the present invention.
Figure 13:
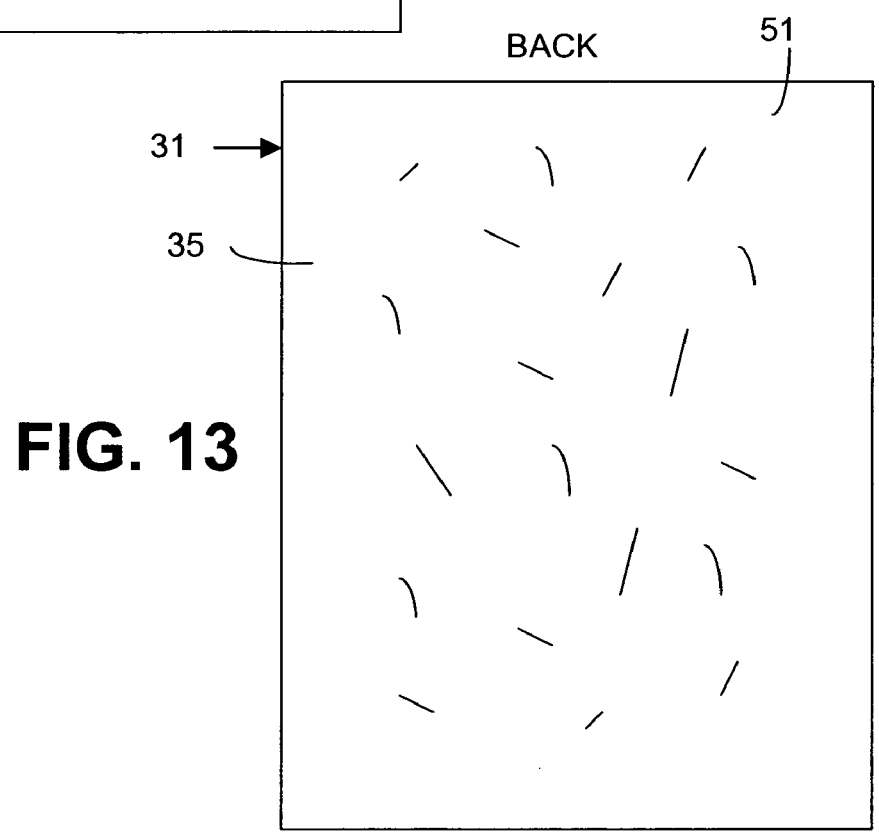
FIG. 13 is a back view of the embodiment of the substitute food item according to the present invention shown in FIG. 12; and, FIG. 14 is a front view of another embodiment of a substitute food item according to the present invention.
Figure 14:
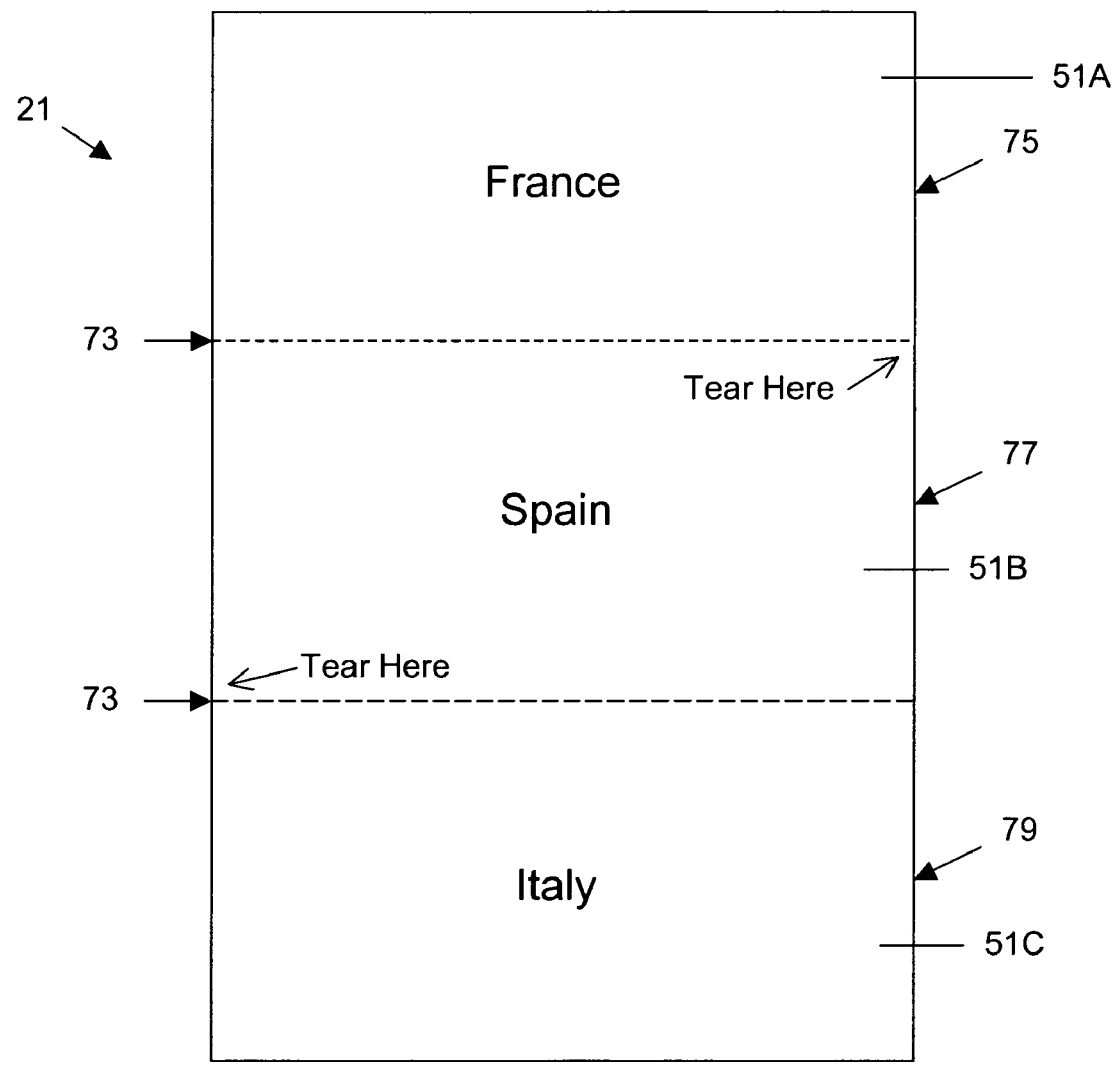

FIGS. 12-14 show additional embodiments of the present invention. The illustrated embodiments include information material 51 positioned on a carrier element such that an information element 61 is formed that at least in the form of writing. The information material 51 may be in the form of edible inks. Such embodiments can act as edible menus (FIGS. 12 and 13) or promotional materials discussing foods of different countries (FIG. 14).

FIG. 12 shows an embodiment in which the information material 51 is printed on a front surface 34 of the carrier element 31. An additional embodiment shown in FIG. 13 is formed from a carrier element 31 having one or more information materials 51—such as flavorings—layered onto a bottom surface 35.

FIG. 14 shows an embodiment in which a substitute food item 21 is subdivided into parts by one or more line of weakened material 73. In this embodiment, each part 75, 77, 79 may include different information materials 51A, 51B, and 51C wherein each of the different information materials is unique from each other. In the illustrated embodiment, the information material 51A may correspond to a food found in France, the information material 51B may correspond to a food found in Spain, and the information material 51C may correspond to a food found in Italy, for example.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. An edible article for acting as a substitute for a food item, comprising:
   a carrier element formed of an edible material;
   said carrier element including a first major surface and a second major surface opposite said first major surface;
   an information element including information related to the food item;
   said information element including one or more information elements;
   disposed on said carrier element;
   a first of said one or more information elements positioned on said first major surface and a second of said one or more information elements positioned on said second major surface.

\* \* \* \* \*